A. E. BARBER.
SHAFT COUPLING.
APPLICATION FILED MAY 25, 1914.

1,150,483. Patented Aug. 17, 1915.

Witnesses:
Lela W. Cook.
Marie Brickell

Albert E. Barber.
INVENTOR.
By George J. Ottoch.
ATTORNEY.

UNITED STATES PATENT OFFICE.

ALBERT E. BARBER, OF MISHAWAKA, INDIANA.

SHAFT-COUPLING.

1,150,483.

Specification of Letters Patent.

Patented Aug. 17, 1915.

Application filed May 25, 1914. Serial No. 840,859.

*To all whom it may concern:*

Be it known that I, ALBERT E. BARBER, a citizen of the United States, residing at Mishawaka, in the county of St. Joseph and State of Indiana, have invented certain new and useful Improvements in Shaft-Couplings, of which the following is a specification.

This invention relates to improvements in couplings designed primarily for connecting shaft connections in endwise relation, the improved coupling constituting an integral resilient member capable of performing the full functions of the coupling and at the same time permitting a yielding under sudden shocks whereby the coupling additionally functions as a shock absorber, rendering it particularly advantageous in connecting the proximate ends of the crank shaft and transmission shaft of an automobile driving mechanism.

The main object of the present invention is the provision of a coupling consisting of a single piece formed for the greater portion of its length to provide a spirally wound circular spring member, the ends being reduced in transverse dimensions and formed to present an interior outline of the angular formation corresponding in size and shape to that of the shaft ends, whereby the coupling is frictionally secured to the shaft ends with the intermediate spring portion arranged between them.

Figure 1:
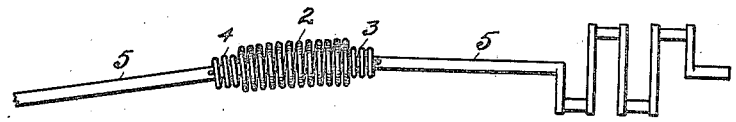
Figure 2:
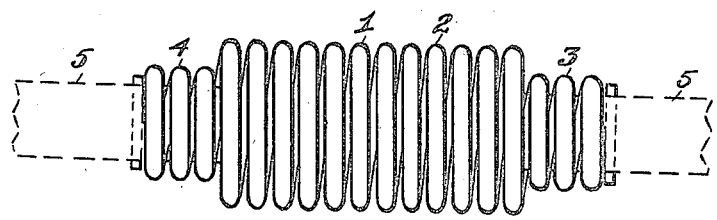
Figure 3:
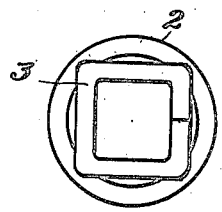

The invention in the preferred form of details will be described in the following specification, reference being had particularly to the accompanying drawings, wherein, Figure 1 is a plan illustrating the application of the coupling to the crank shaft and transmission shaft of an automobile driving mechanism. Fig. 2 is an enlarged view of the coupling with the shaft shown in place on a dotted outline. Fig. 3 is an end elevation of the coupling.

Referring particularly to the accompanying drawings the improved coupling comprises an integral body 1 having a central portion 2 hereinafter termed the spring section and end portions 3 and 4, of duplicate structure and hereinafter termed the connecting sections.

The coupling is constructed of a single length of material of any desired sectional formation which throughout the spring section is formed to provide an ordinary spiral spring construction, the transverse formation of which is preferably circular and the adjacent coils preferably arranged in slightly spaced relation. The terminals of material beyond the spring section are hollow formed in spiral outline though disposed about a rectangular shaft in cross section. The terminals or connecting sections 3 and 4 are thus of angular outline throughout their lengths, corresponding in such outline and in the sectional dimensions thereof to the terminals 5 of the shaft ends which they are to engage. The spring section 2, as also the connecting sections 3 and 4 may be of any appropriate length, and nothing herein is intended as a limitation with respect either to the transverse dimensions of the respective sections or of the interior formation of the connecting sections, so long as the latter are of such shape and size as to snugly and frictionally receive the shaft ends and when in position thereon be held against independent rotative movement.

In use particularly in connection with an automobile driving mechanism the proximate shaft ends are engaged in the respective connecting sections 3 and 4 as shown, the coupling being thus secured against independent rotative movement with respect to both shaft ends.

As the driving shaft is operated the driven shaft receives its rotative action through the coupling 1 the transmission being direct as with an integral structure except that the spring section 2 of the coupling permits a relative yielding of the respective connecting sections 3 and 4 in the rotative plane thereby overcoming sudden jerks and shocks and preventing the transmission of such from one shaft to the other. This is particularly advantageous in automobile structure as such shocks, ordinarily incident to a sudden throwing in of the clutch proves disadvantageous to the connected parts, and these shocks are entirely and wholly obviated by the present coupling.

It is of course to be understood that while the improvement is designed primarily for automobile driving mechanism I contemplate its use as shaft coupling in any and all situations where such coupling could or might be used.

Having thus described my invention, what I desire to secure by Letters Patent is:

1. The combination with shaft terminals adapted for rotation and non-circular in cross section of a coupling for connecting said terminals including a single length of material spirally wound to provide a central portion and reduced end portions projected beyond and in line with the central portion, the end portions having an internal bore corresponding in size and shape with that of the shaft terminals, said end portions being adapted to fit the shaft terminals to secure the coupling as such to both shaft terminals against rotative movement independent of either.

2. The combination with shaft terminals adapted for rotation in unison and being non-circular in cross section, of a coupling including a single spirally wound member having an approximately circular central portion and end portions projected beyond and in line with the central portion, the end portions having an internal bore corresponding in size and shape with that of the shaft terminals, whereby said shaft terminals when connected by the coupling are adapted for simultaneous movement in either direction through the use of the coupling.

In testimony whereof I affix my signature in presence of two witnesses.

ALBERT E. BARBER.

Witnesses:
LELA COOK,
GEORGE OLTSCH.